United States Patent
Fujimoto et al.

(10) Patent No.: US 7,925,402 B2
(45) Date of Patent: Apr. 12, 2011

(54) VEHICLE AIR BAG CONTROL SYSTEM

(75) Inventors: Naoki Fujimoto, Anjo (JP); Masaki Inoue, Obu (JP)

(73) Assignee: DENSO CORPORATION, Kariya (JP)

( * ) Notice: Subject to any disclaimer, the term of this patent is extended or adjusted under 35 U.S.C. 154(b) by 781 days.

(21) Appl. No.: 11/979,321

(22) Filed: Nov. 1, 2007

(65) Prior Publication Data

US 2008/0119990 A1 May 22, 2008

(30) Foreign Application Priority Data

Nov. 21, 2006 (JP) ................. 2006-314326

(51) Int. Cl.
*B60R 21/00* (2006.01)
*G06F 19/00* (2006.01)

(52) U.S. Cl. ............ 701/45; 701/46; 701/112; 180/273; 280/735

(58) Field of Classification Search .................... 701/45, 701/36, 112, 46; 180/273; 280/735; 340/425.5; 307/10.2

See application file for complete search history.

(56) References Cited

U.S. PATENT DOCUMENTS

| 4,275,901 | A | 6/1981 | Okada |
| 6,621,411 | B2 * | 9/2003 | McCarthy et al. ......... 340/425.5 |
| 7,426,429 | B2 * | 9/2008 | Tabe ............................... 701/45 |
| 2004/0217849 | A1 | 11/2004 | Maehara |
| 2005/0073137 | A1 | 4/2005 | Ooyabu |
| 2006/0236970 | A1 | 10/2006 | Inada et al. |
| 2006/0244577 | A1 | 11/2006 | Tanaka et al. |

FOREIGN PATENT DOCUMENTS

| JP | A-6-239187 | 8/1994 |
| JP | A-2001-227375 | 8/2001 |
| JP | A-2004-286775 | 10/2004 |
| JP | A-2004-308497 | 11/2004 |

OTHER PUBLICATIONS

Notification of Reason(s) for Rejection issued from the Japanese Patent Office on Dec. 28, 2010 in the corresponding Japanese patent application No. 2006-314326 (a copy and English translation thereof).

* cited by examiner

*Primary Examiner* — Tan Q Nguyen
(74) *Attorney, Agent, or Firm* — Posz Law Group, PLC (57) ABSTRACT

A vehicle air bag control system includes an impact detector for detecting impact on a vehicle and for outputting an impact detection signal, an air bag deployment determination unit for outputting a deployment command when the impact detection signal is more than a predetermined value, a state estimation unit for estimating whether a vehicle engine is stopped during an idling stop, and a power control unit for driving the impact detector, the air bag deployment determination unit and the state estimation unit when the vehicle engine is stopped during an idling stop as indicated by the state estimation unit.

18 Claims, 6 Drawing Sheets

VEHICLE AIR BAG CONTROL SYSTEM

CROSS REFERENCE TO RELATED APPLICATION

This application is based on and claims priority from Japanese Patent Application No. 2006-314326 filed on Nov. 21, 2006, the disclosure of which is incorporated herein by reference.

TECHNICAL FIELD

The present application relates to generally vehicle control systems, and specifically to a vehicle air bag control system.

BACKGROUND INFORMATION

An air bag system such as that disclosed in JP-A-55-19627 is installed in a vehicle for protecting an occupant in a vehicle when a vehicle is involved in a collision.

Such an air bag system senses an impact at the time of a vehicle collision by an acceleration sensor. When the impact detected with the sensor is more than a predetermined value, the air bag is inflated instantly by igniting gunpowder in the air bag system by battery power. Thus, an occupant is protected. In JP-A-06-239187, even if a battery terminal is detached at the time of a collision, the air bag system can still ignite the gunpowder through a backup capacitor. Also, JP-A-06-239187 describes a system in which an engine key is used as a switch for supplying power to the air bag system. In other words, when the engine key is in an "ON" state (an engine is operating), the air bag system is supplied with power. The backup capacitor usually supplies power to the air bag system when the battery is disconnected when the engine key is in an "ON" state.

Recently, some drivers may manually turn off the engine while, for example, waiting for a long traffic light to turn green. Also, certain vehicle engine systems are designed so that the vehicle engine will turn off while, for example, a driver is waiting for a long traffic light to turn green. Both types of stops will be referred to generally as idling stops. If the driver turns off the engine during such an idling stop, the power supply to the air bag system is cut off. In other words, when the engine is "OFF," the air bag is not actuated even if the vehicle is involved in a collision.

SUMMARY

In view of the above-described problems, it is an object to provide a vehicle air bag control system that can maintain an air bag system in an activated state even if a vehicle engine is turned off during an idling stop.

According to a present exemplary embodiment, a vehicle air bag control system includes an impact detector for detecting an impact on a vehicle and for outputting an impact detection signal, an air bag deployment determination unit for outputting a deployment command when the impact detection signal is more than a predetermined value, a state estimation unit for estimating whether a vehicle engine is stopped during an idling stop, and a power control unit for driving the impact detector, the air bag deployment determination unit and the state estimation unit when the vehicle engine is stopped during the idling stop as indicated by the state estimation unit.

Thus, even if the engine is stopped during an idling stop, the impact detector detects the impact detection signal and the air bag can be deployed. Therefore, even if the driver performs the idling stop while waiting for a traffic signal, the air bag can be deployed, and vehicle safety can be increased.

Preferably, the state estimation unit includes an engine state detector for detecting an operation state of the engine and for outputting an engine state, and an occupant detection sensor for detecting whether an occupant is in the vehicle and for outputting an occupant signal. The state estimation unit estimates that the engine stop is caused during the idling stop when the engine state indicates that the engine is stopped and the occupant signal indicates the occupant is in the vehicle.

According to the above estimation, when the occupant is not in the vehicle and an impact from collision is generated, the state estimation unit estimates the engine stop is not an idling stop. Therefore, the deployment of the air bag by the air bag deployment determination unit can be prevented.

Preferably, the vehicle air bag control system further includes a sensitivity adjuster for adjusting the amplification factor of the output signal from the impact detector and for outputting an amplified impact detection signal.

The state estimation unit estimates whether the engine stops due to parking of the vehicle and outputs a first sensitivity command when the state estimation unit estimates the engine stops during an idling stop and outputs a second sensitivity command when the state estimation unit estimates that the engine stops due to parking of the vehicle. The sensitivity adjuster adjusts the amplification factor of the output signal from the impact detector based on the first sensitivity command or the second sensitivity command.

Thus, the amplification factor of the output signal from the impact detector is adjusted depending on whether the engine stops during an idling stop. Therefore, the output signal from the impact detector can be used except when the deployment determination of the air bag indicates that the amplification factor is different.

The vehicle air bag control system may further include a theft determination unit for calculating an inclination angle of the vehicle based on the impact detection signal when the state estimation unit outputs the second sensitivity command and for determining whether the vehicle is being stolen based on the inclination angle.

Therefore, the impact detector can be used for both the determination of air bag deployment and theft determination.

The state estimation unit may estimate that the engine stop is caused by a state other than the Idling stop and outputs the second sensitivity command when the engine state indicates the engine stops and the occupant signal indicates the occupant is not in the vehicle.

According to the estimation, when the engine is stopped, the occupant is in the vehicle and an impact indicating that the air bag should be deployed if the engine is working is generated, the air bag deployment determination unit estimates the engine stop is caused during an idling stop. Therefore, the air bag can be deployed to protect the occupant.

Preferably, the occupant detection sensor includes at least one of a sitting position detection sensor installed in a vehicle seat, a camera installed in the vehicle, an infrared sensor for detecting an occupant temperature and a seat belt sensor for detecting whether a seat belt is fastened.

Therefore, whether the engine is stopped during an idling stop can be detected accurately and air bag deployment if no occupant is present can be suppressed.

The state estimation unit may include an engine state detector for detecting an operation state of the engine and for outputting an engine state, and a position information provision unit for providing vehicle position information. The state estimation unit estimates that the engine stop is caused during an idling stop when the engine state indicates that the engine stops and the vehicle position provided by the position information provision unit indicates the vehicle is within a predetermined area.

Therefore, whether the engine is stopped during an idling stop can be detected more accurately.

The state estimation unit may estimate that the engine stop is caused by a state other than the idling stop and outputs the second sensitivity command when the engine state indicates the engine stops and the vehicle position provided by the position information provision unit indicates that the vehicle is outside the predetermined area Preferably, the predetermined area is at least one of an intersection, a passing traffic lane, and a no-parking zone.

The vehicle air bag control system may further include a capacitor installed between a vehicle battery and the air bag deployment determination unit. The air bag deployment determination unit is driven by electric power supplied by the capacitor at least when the state estimation unit estimates the engine stops during the idling stop. The theft determination unit is activated when the state estimation unit estimates the engine stops due to vehicle parking and the capacitor does not supply electric power to the air bag deployment determination unit.

When the state estimation unit estimates the engine stops during the idling stop, the air bag deployment determination unit is activated when electric power is supplied from the capacitor. Therefore, the air bag deployment determination unit remains operational even if the battery is disconnected with the air bag deployment determination unit due to a collision with another vehicle. On the other hand, when the state estimation unit estimates the engine stops due to vehicle parking and the capacitor does not supply electric power to the air bag deployment determination unit, the theft determination unit is activated. Therefore, air bag deployment can be prevented during vehicle parking (except during an idling stop) and vehicle theft can be accurately determined.

Preferably, the air bag deployment determination unit is not actuated during the operation of theft determination unit.

When a signal range of the impact detection signal that air bag deployment determination unit uses for the determination is different from a signal range of the impact detection signal that the theft determination unit uses for the determination, the air bag deployment determination unit can determine theft based on a range of the impact detection signal for theft determination unit. Therefore, mistaken deployment of the air bag can be prevented.

The theft determination unit may stop operating or decrease the frequency of operation when the state estimation unit estimates the engine stops due to a state other than the idling stop and the battery supplies the theft determination unit with electric power and the remaining capacity of the battery is less than a predetermined value.

Therefore, a state in which the remaining capacity of the battery has run out and the engine can not restart or a state in which the remaining capacity of the battery has run out and the theft determination unit stops is suppressed.

Preferably, the state estimation unit warns an occupant in the vehicle when it estimates the engine stops during an idling stop and the remaining capacity of a vehicle battery is less than a predetermined value.

Therefore, the remaining capacity of the battery can be preserved during the idling stop and the air bag unit can still be deployed.

Preferably, the impact detector is an acceleration sensor installed in the vehicle.

According to another aspect of the present exemplary embodiment, a vehicle air bag control system includes an impact detector for detecting an impact on a vehicle and for outputting an impact detection signal, and a microprocessor configured to output an air bag deployment command when the impact detection signal is more than a predetermined value, to estimate whether a vehicle engine is stopped during an idling stop and to drive the impact detector and deploy an air bag when the vehicle engine is stopped during the idling stop.

BRIEF DESCRIPTION OF THE DRAWINGS

Other objects, features and advantages of the present invention will become more apparent from the following detailed description made with reference to the accompanying drawings, in which.

DETAILED DESCRIPTION OF THE PREFERRED EMBODIMENTS

Exemplary embodiments are described as follows.

First Exemplary Embodiment

A first exemplary embodiment is explained with reference to FIGS. 1-3.

Figure 1:
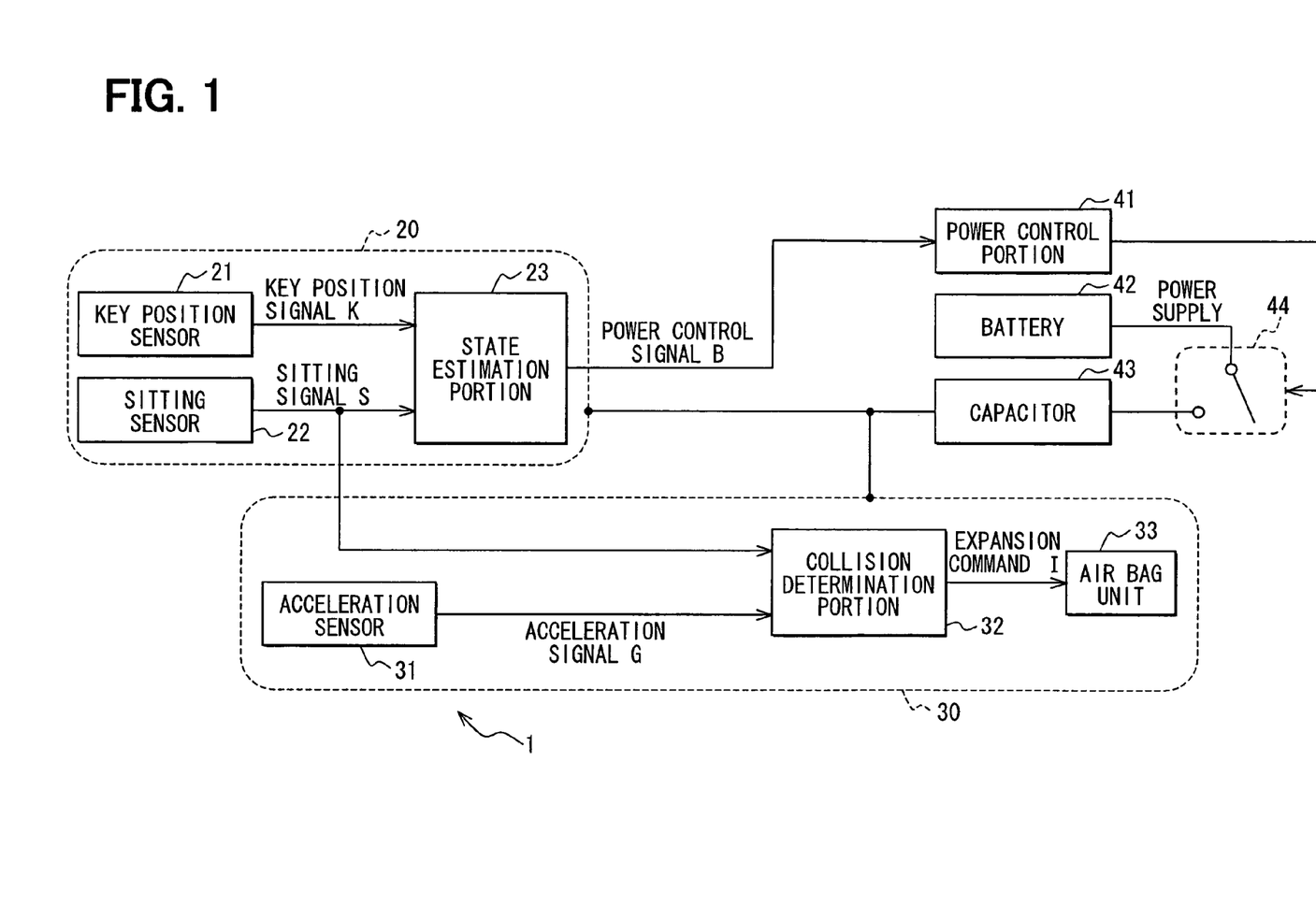
FIG. 1 is a block diagram of an air bag system according to a first exemplary embodiment.

FIG. 1 is a block diagram showing a configuration of an air bag system 1 of the first exemplary embodiment. As shown FIG. 1, the air bag system 1 includes a state estimation sub-system 20 for determining a vehicle state, a collision determination sub-system 30 for determining whether an air bag unit 33 is deployed, a power control unit 41, a battery 42 and a capacitor 43.

The state estimation sub-system 20 is explained. The state estimation sub-system 20 includes a key position sensor 21 for detecting a key position of a vehicle key cylinder and for outputting a key position signal K, a sitting sensor 22 installed in a vehicle seat for detecting an occupant in the seat and for outputting a sitting signal S, and a state estimation portion 23 for outputting a power control signal B based on the key position signal K and the sitting signal S.

The key position signal K, which the key position sensor 21 outputs, outputs four types of signals such as "ON" (engine is operating), "ACC" (engine is stopped and the battery 42 operates electrical equipments), "OFF" (engine is stopped along with the electrical equipment), "START" (starter is driven) and "NULL" (a key is not inserted into a key cylinder).

In a vehicle including the smart entry and smart start system that starts the engine (ignition "ON") not by the key rotation but by pushing of a push switch on or near an instrument panel, "START," "ON," "ACC," "OFF" and "NULL" (a state in which an occupant is not near the vehicle) engine signals can be substituted for the key position signal. This key position signal K indicates the state of the power source of the vehicle including the engine state.

The sitting sensor 22 is a sensor for detecting the presence of an occupant in the seat by a change of capacitance or load to the seat bottom. This sitting sensor 22 outputs an ID of an occupied seat as a sitting signal S based on a specific ID assigned to every seat.

The state estimation portion 23 executes a process described below in the flow diagram of FIG. 2. The state estimation portion 23 determines whether electric power is supplied to the state estimation sub-system 20 and the collision determination sub-system 30, and outputs the determination result as a power control signal B to the power control unit 41. The states of this power control signal B are an "ON" (power supply is performed) state and an "OFF" (power supply is stopped) state.

The power control unit 41 sets a switch 44 to supply electric power to the state estimation sub-system 20 and collision determination sub-system 30 when the power control signal B is equal to "ON." On the other hand, the power control unit 41 sets the switch 44 not to supply electric power to the state estimation sub-system 20 and the collision determination sub-system 30 when the power control signal B is equal to "OFF." The power control unit 41 corresponds to a power control unit in claims.

The capacitor 43 is placed between the battery 42 and the state estimation sub-system 20 and between the battery 42 and the collision determination sub-system 30. The capacitor 43 can continue to supply electric power for several seconds (such as, for example 1 [sec], the time that the state estimate portion 23 can process approximately 10 iterations), even if the state estimation portion 23 outputs the power control signal B equal to "OFF." The capacitor 43 also can continue to supply electric power to the state estimation sub-system 20 and the collision determination sub-system 30 even if the power supply between battery 42 and capacitor 43 is cut off by an impact such as a collision.

The collision determination sub-system 30 is explained next. The collision determination sub-system 30 includes an acceleration sensor 31 installed in each part of the vehicle for detecting an acceleration applied to the vehicle and for outputting as acceleration signal G, a collision determination portion 32 for outputting an deployment command I to the air bag unit 33 based on the acceleration signal G and the sitting signal S, and an air bag unit 33 including an air bag for deploying when the deployment command I is received.

Regarding the acceleration sensor 31, a comb teeth capacitance-type acceleration sensor produced by a semiconductor process and a pendulum type acceleration sensor can be used. Additionally, the acceleration sensor 31 may have ranges of sensitivities and may be used for a determination for air bag deployment, a vehicle control represented by VDIM (Vehicle Dynamics Integrated Management), and for determining whether a vehicle has been stolen by detecting an inclination angle of the vehicle. The acceleration sensor 31 corresponds to an impact detector in claims.

The air bag unit 33 generally represents an air bag, an inflator and an impact sensor. When the deployment command I is input to the air bag unit 33, the inflator is ignited and the air bag unit 33 deploys. The air bag unit 33 may be installed in each seat and separately deployed depending on the deployment command I.

The collision determination portion 32 outputs the deployment command I to the air bag unit 33 in order to deploy the air bag unit 33 in the seat corresponding to the ID included in the sitting signal S. Because it recognizes the seat in which the occupant is located based on the sitting signal S, the collision determination portion 32 outputs the deployment command I of the air bag in order to protect an occupant sitting in the seat. The collision determination portion 32 corresponds to an air bag deployment determination unit in claims.

The state estimation portion 23 and the collision determination portion 32 may be configured on a microcomputer having an IO port and A/D converter.

Figure 2:
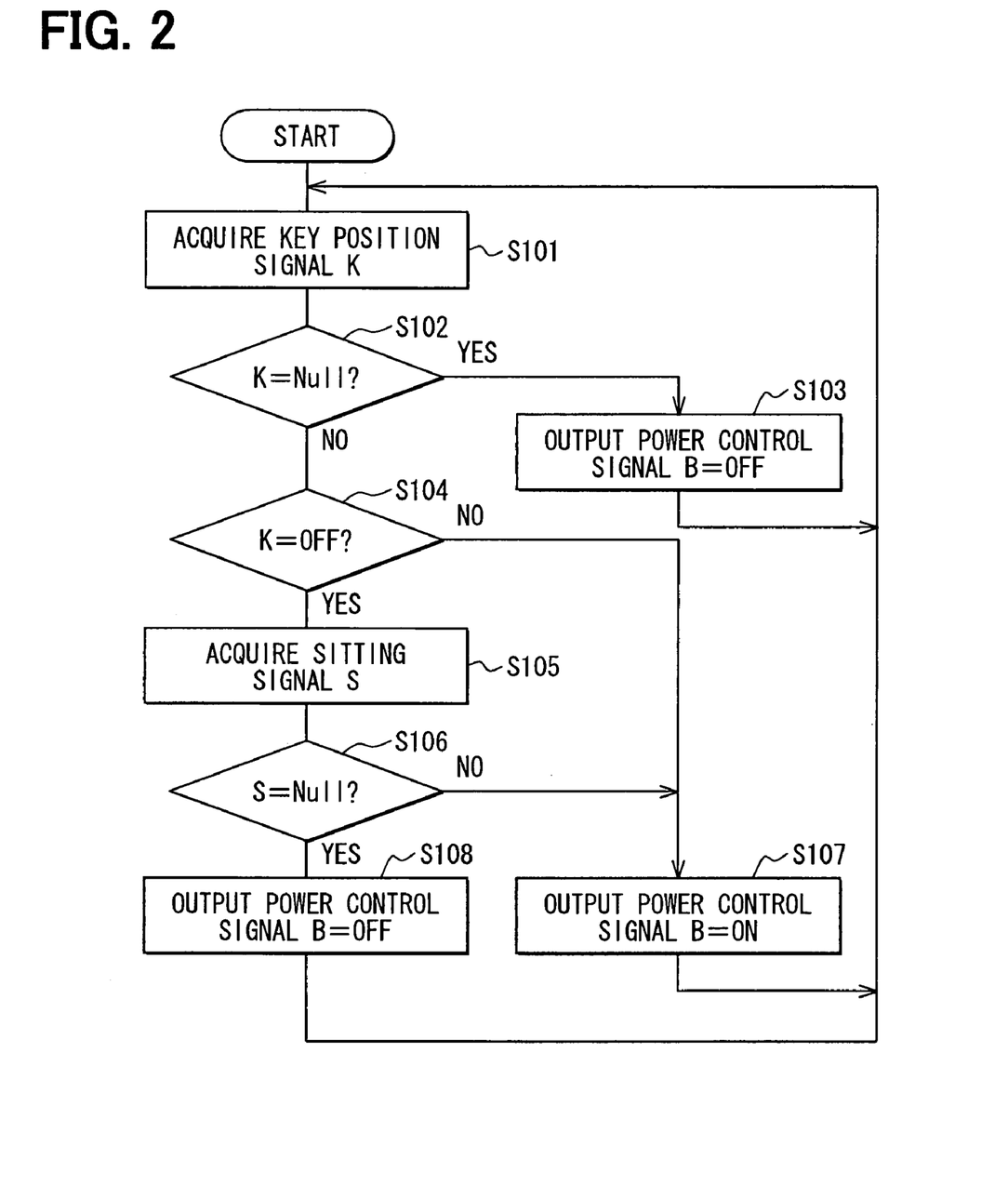
FIG. 2 is a flow diagram showing an internal processing of a state estimating portion according to the first exemplary embodiment.

A process executed by the state estimation portion 23 is described by the flow diagram of FIG. 2.

The process starts from S101 and is executed at regular intervals, such as every 100 [msec]. When a difference between a time when S101 is executed n times and a time when S101 is executed n+1 times is regarded as a control cycle, a control cycle of the state estimate portion 23 is 100 [msec]. Generally, a control cycle of a microcomputer for vehicle control is often set around 10 [msec]. However, because the state estimation portion 23 is driven by capacitor 43 depending on a case described below, the electrical power consumption is suppressed by prolonging the control cycle.

The state estimation portion 23 acquires the key position signal K from key position sensor 21 at S101. At S102, the state estimation portion 23 determines whether a divergence exists depending on whether the key position signal K is equal to "NULL." When the state estimation portion 23 determines that the key position signal K is equal to "NULL," it advances to S103. When the state estimation portion 23 determines that the key position signal K is not equal to "NULL," it advances to S104.

At S103, the state estimation portion 23 outputs the power control signal B equal to "OFF" and returns to S101. If the process advances to S103, the key is not inserted into the key cylinder. It is therefore considered that the driver is going to leave the vehicle. Therefore, the driver may leave his original sitting position. In this situation, even if a collision does occur, deployment of the air bag unit 33 is not desirable. Furthermore, when the power control signal B is immediately output equal to "OFF," an effect of the consumption suppression of the battery 42 is assumed.

At S104, the state estimation portion 23 determines whether a divergence exists depending on whether the key position signal K is equal to "OFF." When the state estimation portion 23 determines that the key position signal K is equal to "OFF," it advances to S105. When the state estimation portion 23 determines that the key position signal K is not equal to "OFF," it advances to S107.

At S105, the state estimation portion 23 acquires the sitting signal S. At S106, the state estimation portion 23 determines whether a divergence exists depending on whether the sitting signal S is equal to "NULL." The "NULL" indicates a state that the seat ID is not included in the sitting signal S, indicating that the seat is not occupied. When the state estimation portion 23 determines that the sitting signal S is equal to "NULL" at S106, it advances to S108. When the state estimation portion 23 determines that the sitting signal S is not equal to "NULL," it advances to S107.

At S107, the state estimation portion 23 outputs the power control signal B equal to "ON" and returns to S101. When the power control signal B is output equal to "ON," the electric power supply from the battery 42 to the state estimation sub-system 20 and the collision determination sub-system 30 is continued.

At S108, the state estimation portion 23 outputs the power control signal B equal to "OFF" and returns to S101. When the power control signal B is output equal to "OFF," the switch 44 is switched to an "OFF" position and the electric power supply from the battery 42 to the state estimation sub-system 20 and the collision determination sub-system 30 is cut off. However, the capacitor 43 continuously supplies electric power for approximately 1 [sec] after S108 is executed. Therefore, after the process of S108 is executed for the first time, the process returns to S101 is executed through S108 for approximately 10 iterations. The state estimation portion 23 corresponds to a state estimation unit in claims.

Next, a process executed with collision determination portion 32 is described with reference to the flow diagram of FIG. 3. A control cycle of the collision determination portion 32 is set to approximately 1 [msec] so that the air bag unit 33 is deployed immediately at the time of a collision. The control cycle of the collision determination portion 32 is shorter than the control cycle of the state estimation portion 23.

At S201, the collision determination portion 32 acquires an acceleration signal G from the acceleration sensor 31. At S202, the collision determination portion 32 determines whether a divergence exists depending on the acceleration signal G. When the collision determination portion 32 determines that the acceleration signal G is bigger than a threshold Gth, it advances to S203. When the collision determination portion 32 determines that the acceleration signal G is not bigger than a threshold Gth, it returns to S201.

At S203, the collision determination portion 32 acquires a sitting signal S from the sitting sensor 22. At S204, the collision determination portion 32 determines whether a divergence exists depending on the sitting signal S. When the collision determination portion 32 determines that the sitting signal S is equal to "NULL," it finishes the process. When the collision determination portion 32 determines that the sitting signal S is not equal to "NULL," it advances to S205. At S205, the collision determination portion 32 outputs the deployment command I to the air bag unit 33 in order to deploy the air bag unit 33 of the seat corresponding to the ID included in sitting signal S. When the sitting signal S is equal to "NULL" at S204, the collision determination portion 32 does not output the deployment command I and finishes the process because it is determined that the seat is unoccupied.

Figure 3:
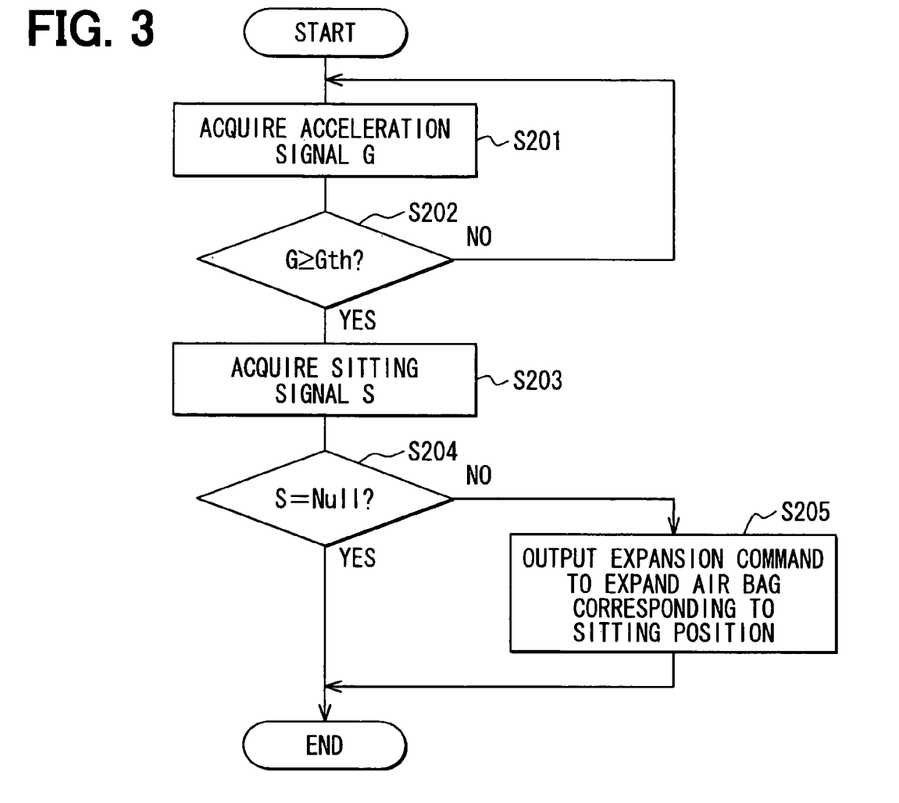
FIG. 3 is a flow diagram showing an internal processing of a collision determination portion according to the first exemplary embodiment.

The collision determination process explained in FIG. 3 is a well-known process used for the air bag system 1. The above process may be added to a process that determines deployment of the air bag unit 33 by, for example, whether a seat belt is fastened or/and a difference of the acceleration signal G of each acceleration sensor 31.

Effects of the air bag system 1 of the present exemplary embodiment are described as follows. As mentioned above in connection with FIG. 2, even if the engine is stopped, the air bag system 1 deploys an air bag unit 33 when an occupant occupies a seat and the acceleration sensor 31 detects a big impact. Therefore, even if the key position is located in an "OFF" position and the vehicle is in an idling stop while the driver waits for a traffic signal, deployment of the air bag unit 33 is possible and vehicle safety is increased.

On the other hand, when a seat is not occupied, the state is considered not a temporary idling stop but a state in which the occupant was parked and exited the car. Therefore, the electric power supply to the state estimation portion 23 and the collision determination portion 32 from the battery 42 is stopped. Power consumption of the battery 42 can be suppressed.

The capacitor 43 is installed between the battery 42 and the state estimation portion 23 and between the battery 42 and the collision determination portion 32. Therefore, the supply of electric power to the collision determination portion 32 and the state estimation portion 23 is not stopped. Specifically, even if, for example, the sitting signal S is equal to "NULL" (S="NULL") and the power control signal B is equal to "OFF" (B="OFF") due to noise being superimposed on the sitting signal S, even though the key position signal K is actually equal to "OFF" (K="OFF") and the sitting signal is actually not equal to "NULL" (S≠"NULL"), the electric power supply is not stopped unless the power control signal B equal to "OFF" (B="OFF") is successively output approximately 10 iterations due to accumulated power in the capacitor 43. When the superimposed noise is over and the sitting signal S is correctly input so that the sitting signal S is not equal to "NULL" (S≠"NULL"), the power control signal B becomes equal to "ON" (B="ON"). Therefore, the situation that the air bag unit 33 is not deployed though the driver sits down can be prevented. In other words, reliability of the air bag system 1 can be increased.

Second Exemplary Embodiment

A second exemplary embodiment is explained with reference to FIGS. 4-6. The difference between the first exemplary embodiment mentioned above and the second exemplary embodiment is that a theft determination system 50 and the air bag system 1 are combined. Regarding the second exemplary embodiment, the same numerals are used for components and devices that are identical to those in the first exemplary embodiment and corresponding explanation is omitted.

Figure 4:
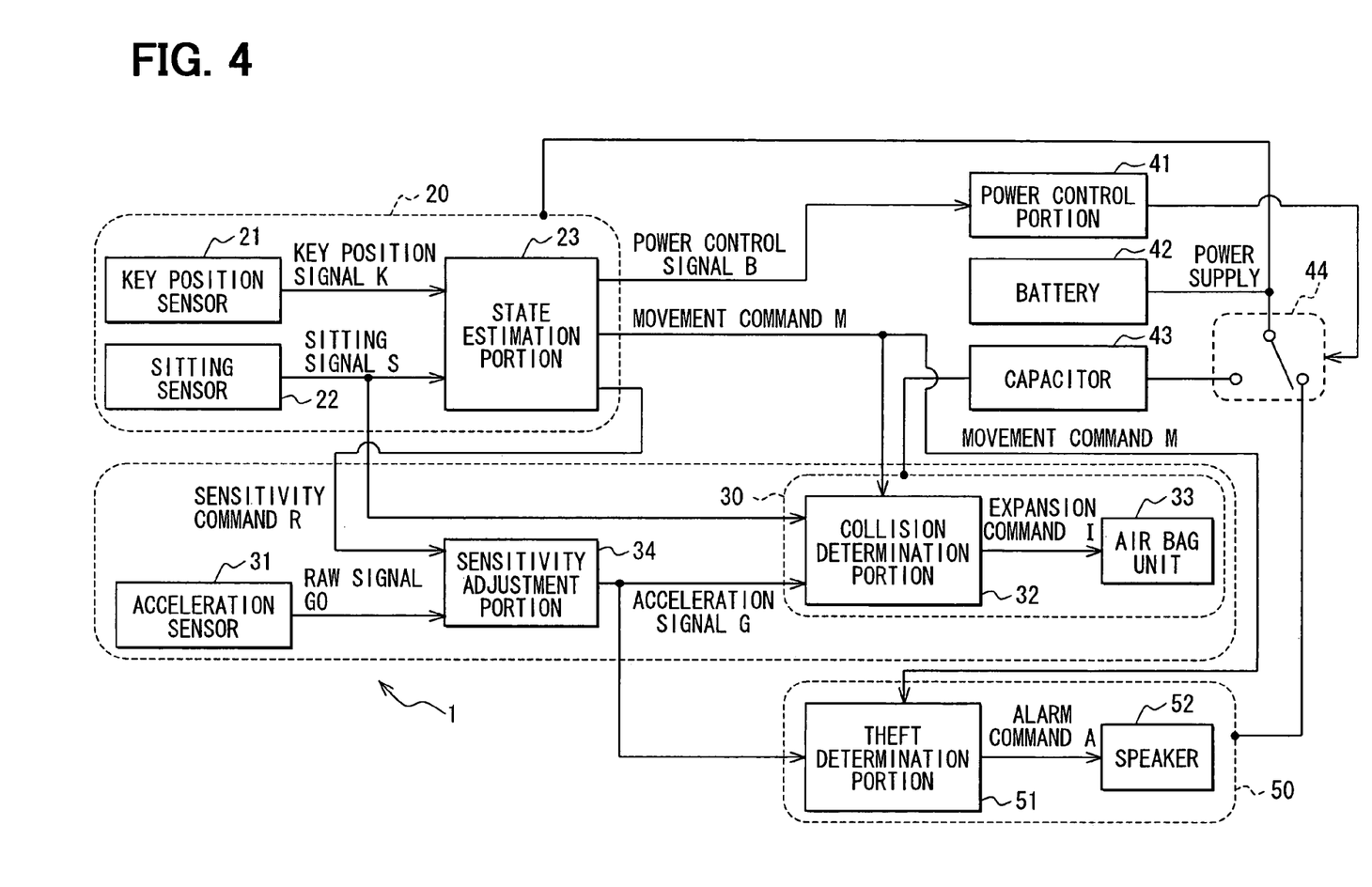
FIG. 4 is a block diagram of an air bag system and a theft determination system according to a second exemplary embodiment.

A system configuration is shown in the block diagram of FIG. 4. The state estimation sub-system 20 is configured similarly to the configuration described in the first exemplary embodiment mentioned above. However, a point that the state estimation portion 23 outputs a movement command to either the collision determination sub-system 30 or a theft determination system 50 and a point that the state estimation portion 23 output a sensitivity command R to a sensitivity adjustment portion 34 described below are different.

The sensitivity command R is of two types including an "AB mode" for commanding a sensitivity adjustment portion 34 described below to adjust a raw signal GO of acceleration sensor 31 for a collision determination range and an "ST mode" for commanding the sensitivity adjustment portion 34 to adjust the raw signal GO for a theft determination range. The power control signal B is different from that described in the first exemplary embodiment. The power control signal B is of two types including an "AB mode" for driving the collision determination sub-system 30 and a "ST mode" for driving the theft determination system 50.

The battery 42 supplies electric power to the collision determination portion 32 and air bag unit 33 through the capacitor 43. It is different from the first exemplary embodiment. The acceleration sensor 31 and the sensitivity adjustment portion 34 are continuously supplied with electric power. The power control unit 41 supplies electric power to the collision determination portion 32 and the air bag unit 33 from the battery 42 when the power control signal B is equal to "AB mode" (B=AB). The power control unit 41 supplies electric power to the theft determination system 50 from the battery 42 when the power control signal B is equal to "ST mode" (B=ST).

The collision determination sub-system 30 is different from the first exemplary embodiment in that a sensitivity adjustment portion 34 for adjusting a sensitivity of a raw signal GO from the acceleration sensor 31 is added and that a movement command M is input to the collision determination portion 32.

Several operational amplifiers are installed in an output stage of a not-illustrated C-V converter circuit of the acceleration sensor 31. The sensitivity adjustment portion 34 adjusts an amplification factor of the raw signal GO which the acceleration sensor 31 outputs by, for example, changing the operational amplifiers based on the sensitivity command R that the state estimation portion 23 outputs. The process executed with the collision determination portion 32 is same as the process described in the first exemplary embodiment.

The movement commands M are two pattern modes including a collision determination mode (M=AB) and a theft determination mode (M=ST). The collision determination mode and the theft determination mode are mutually exclusive of one an other. In other words, the movement command M is either the collision determination mode or the theft determination mode.

Next, the theft determination system 50 added in this second exemplary embodiment is explained. The theft determination system 50 detects an inclination of the vehicle using the acceleration sensor 31 for vehicle control and/or impact detection. The theft determination system 50 provides a warning or alarm by a speaker 52 when an occupant is not detected and the vehicle is inclined. The reason why such a process is executed is as follows.

A situation in which the vehicle is inclined when an occupant is not present occurs when the vehicle is lifted by a tow truck or a floor jack without consent of the vehicle owner. The theft determination system 50 is executed while the vehicle is in a stopped state. Therefore, the acceleration sensor 31 for vehicle control or impact detection can be used. However, the ranges of the acceleration used for the determinations are different. Therefore, the sensitivity of a raw signal GO from the acceleration sensor 31 is adjusted to an acceleration signal G which is included in a suitable range for the theft determination by the sensitivity adjustment portion 34.

A process of the state estimation portion 23 is explained with reference to the flow diagram of FIG. 5. At S301, the state estimation portion 23 acquires the key position signal K. At S302, the state estimation portion 23 determines whether a divergence exists depending on whether the key position signal K is equal to "NULL." When the state estimation portion 23 determines that the key position signal K is equal to "NULL," it advances to S303. When the state estimation portion 23 determines that the key position signal K is not equal to "NULL," it advances to S306.

At S303, the state estimation portion 23 outputs the power control signal B equal to "ST mode" (B=ST). The state estimation portion 23 drives the battery 42 with a prevention theft mode, and namely supplies the theft determination system 50 with power from the battery 42.

At S304, the state estimation portion 23 outputs a sensitivity command R equal to "ST mode" (R=ST) to the sensitivity adjustment portion 34. At S305 continuing from S304, the state estimation portion 23 outputs the movement command M with the theft determination mode (M=ST) to the theft determination portion 51 and returns to S301.

The processes from S303 to S305 are executed when the key is not inserted into the key cylinder. Because the key is not inserted into the key cylinder, it can be determined that the vehicle is parked. Therefore, by stopping the electric power supply to the air bag unit 33 by making the power control signal B equal to "ST mode" (B=ST), the air bag unit 33 can be prevented from mistakenly deploying the air bag. The electric power supply to the theft determination system 50 is started by making the power control signal B equal to "ST mode" (B=ST). According to making the sensitivity command R to the sensitivity adjustment portion 34 equal to "ST mode" (R=ST), the signal detected by the acceleration sensor 31 can be amplified within the suitable range for theft determination. According to outputting movement command M with the theft determination mode (M=ST), a process at the theft determination portion 51 is started. Therefore, as described below, a warning can be generated before the vehicle has been stolen.

At S306, the state estimation portion 23 determines whether a divergence exists depending on whether the key position signal K is equal to "OFF." When the state estimation portion 23 determines that the key position signal K is equal to "OFF," it advances to S307. When the state estimation portion 23 determines that the key position signal K is not equal to "OFF," it advances to S314.

At S307 diverged from S306, the state estimation portion acquires the sitting signal S. At S308, the state estimation portion 23 determines whether a divergence exists depending on whether the sitting signal S is equal to "NULL." When the state estimation portion 23 determines that the sitting signal S is equal to "NULL," it advances to S309. When the state estimation portion 23 determines that the sitting signal S is not equal to "NULL," it advances to S314.

At S309, the state estimation portion 23 increments a time counter T by one. The time counter T is reset (=0) when the vehicle engine starts and at S314.

At S310, the state estimation portion 23 determines whether a divergence exists depending on whether the time counter T is bigger than a threshold Tth. When the state estimation portion 23 determines that the time counter T is bigger than the threshold Tth, it advances to S311. When the state estimation portion 23 determines that the time counter T is not bigger than a threshold Tth, it advances to S315. The threshold Tth is a time that is set a bit longer (concretely, 2[sec]) than discharge time (1 [sec]) of the capacitor 43 installed between battery 42 the state estimation sub-system 20 and between battery 42 and the state estimation sub-system 20 and the collision determination portion 32.

At S311, the state estimation portion 23 outputs the power control signal B equal to "ST mode" (B=ST) and drives the battery 42 with a theft prevention mode. At S312, the state estimation portion 23 outputs the sensitivity command R equal to "ST mode" (R=ST) to the sensitivity adjustment portion 34. At S313, the state estimation portion 23 outputs the movement command M with the theft determination mode (M=ST) and returns to S301.

On the other hand, the state estimation portion 23 advances from S306 to S314 when the key position signal K is not equal to "OFF" (K="ACC" or "ON") or from S308 to S314 when the sitting signal is not equal to "NULL" (the engine stops but an occupant is present in the seat) at S308. At S314, the state estimation portion 23 resets the time counter T (=0).

The state estimation portion 23 advances to S315 when the time counter T is not bigger than the threshold Tth at S310 or when the time counter T is reset at S314. The state estimation portion 23 outputs the power control signal B equal to "AB mode" (B=AB). The state estimation portion 23 drives the battery 42 at an air bag mode, and namely supplies electric power to the collision determination sub-system 30 from the battery 42. At S316, the state estimation portion 23 outputs the sensitivity command R equal to "AB mode" (R=AB) to the sensitivity adjustment portion 34. At S317, the state estimation portion 23 outputs the movement command M with the collision determination mode (M=AB) to the collision determination portion 32 and returns to S301.

The process executed in the theft determination portion 51 is explained with reference to the flow diagram of FIG. 6. The process from S401 to S404 is executed in a predetermined cycle (such as, for example, every 1 [sec]). This cycle is longer than the execution cycle of the state estimation portion 23.

At S401, the theft determination portion 51 acquires the acceleration signal G. At S402, the theft determination portion 51 calculates a vehicle inclination angle • based on the acceleration signal G. At S403, the theft determination portion 51 determines whether a divergence exists depending on whether the inclination angle • is bigger than a threshold •th. When the theft determination portion 51 determines that the inclination angle • is bigger than the threshold •th, it advances to S404 because it is determined that the vehicle is being lifted by a jack. When the theft determination portion 51 determines that the time counter T is not bigger than a threshold •th, it returns to S401. At S404, the theft determination portion 51 provides a warning by speaker 52 and returns to S401.

According to this process, even if an idling stop is performed, an occupant can be protected by the air bag unit 33 as in the first exemplary embodiment. A control cycle of the collision determination portion 32, which determines whether the air bag unit 33 is deployed, is short. The control cycle is, for example, around 1 [msec]. Therefore, the electrical power consumption is high by the battery drive. However, as described the second exemplary embodiment, when a seat is not occupied, by not deploying the air bag unit 33 by using the sitting signal S for the determination, the consumption of battery power can be suppressed. Additionally, the consumption of battery power during parking can be suppressed by making the cycle of the theft determination portion 51 longer than the cycle of the collision determination portion 32. The cycle of the theft determination portion 51 is preferably from around 10 times to around 200 times the cycle of the collision determination portion 32, or around 1[sec] to around 10[sec].

Figure 5:
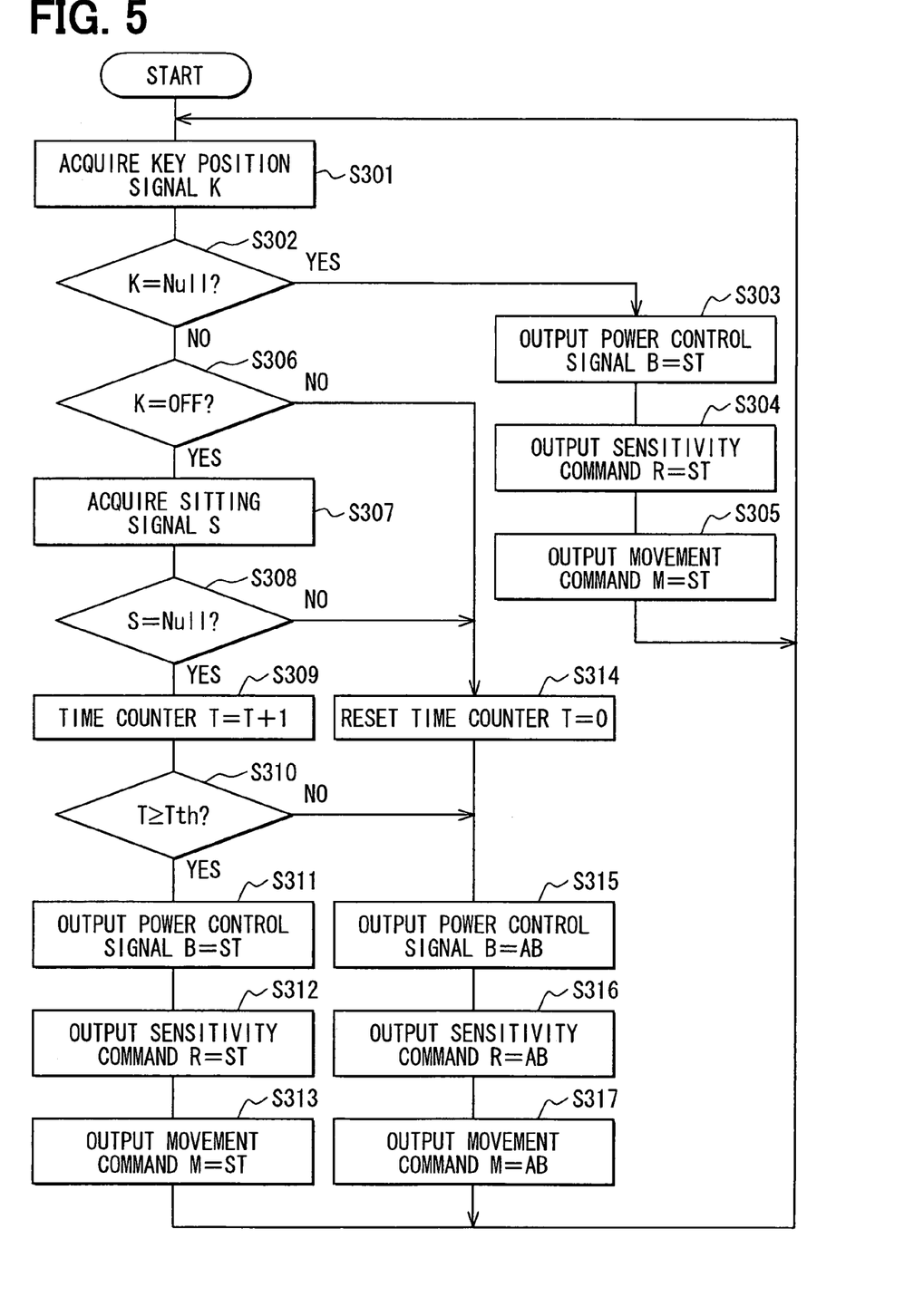
FIG. 5 is a flow diagram showing an internal processing of a state estimation portion according to the second exemplary embodiment.
Figure 6:
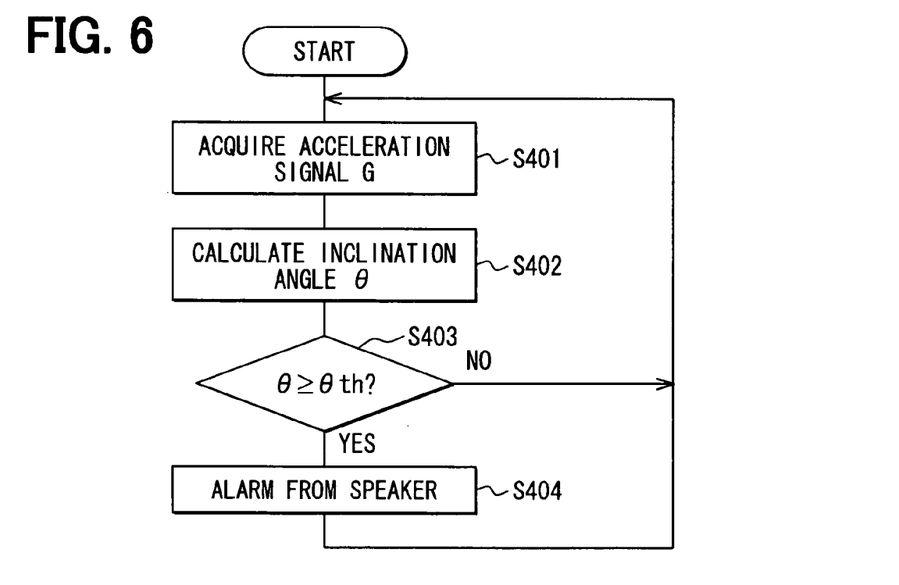
FIG. 6 is a flow diagram showing internal processing of a theft determination portion according to the second exemplary embodiment.

Furthermore, in the second exemplary embodiment, because the sensitivity of the acceleration sensor 31 is adjusted based on sitting signal S and key position signal K as shown in FIG. 5, a common acceleration sensor 31 can be used for both the collision determination and the theft determination. Even if the engine stops are in the same state, when an occupant is in the vehicle, the air bag unit 33 can be deployed. Contrarily, when an occupant is not in the vehicle, theft determination can be performed.

By setting the threshold Tth a bit longer than the discharge time, the theft determination is performed after the energy stored in the capacitor 43 is depleted. Therefore, the acceleration signal G in a theft determination range is input into the collision determination portion 32 from the sensitivity adjustment portion 34. The air bag unit 33 can therefore be prevented from mistakenly deploying.

Third Exemplary Embodiment

A third exemplary embodiment is explained as follows. The difference of the third exemplary embodiment from each of the above first and second embodiments is that a warning is generated when the collision determination sub-system 30 is unable to operate in an idling stop state due to consumption of the battery 42.

Regarding the third exemplary embodiment, the same numerals are used for components and devices that are identical to those in above embodiments, and corresponding explanation is omitted.

The state estimation portion 23 of the third exemplary embodiment acquires a remaining capacity signal indicating a total remaining capacity of the battery 42. When the key position signal is equal to "OFF" or "ACC," the sitting signal S is not equal to "NULL" (the occupant is in the vehicle) and the total remaining capacity of the battery 42 indicated by the remaining capacity signal is lower than threshold, the state estimation portion 23 generates an alarm with a speaker 52 in the vehicle or a not-illustrated indicator light so that the driver starts the engine. Regarding the total remaining capacity, when the total remaining capacity falls so as to enable the battery 42 to the air bag system 1 drive for only 1 [min], the state estimation portion 23 alarms. The threshold is set in view of the electric power consumption of a starter at the engine start and the current power consumption of electrical equipment (such as an air conditioner and navigation system).

The determination method of the alarm is described in detail. At first, the state estimation portion 23 subtracts the power consumption of such as a starter necessary to restart the engine from the total remaining capacity of the battery 42, and calculates an extra remaining capacity. Secondly, the state estimation portion 23 calculates total power consumption per unit time. The total power consumption is the sum of the power consumption of the current operating electrical equipment and the power consumption of air bag system 1. Subsequently, the state estimation portion 23 divides the extra remaining capacity by the total power consumption. If the result of the division is less than a threshold (for example 1[min]), the state estimation portion 23 generates the alarm.

Because the occupant restarts the engine by the above process, the total remaining capacity of the battery 42 decreasing below a level required to deploy the air bag unit 33 during an idling stop can be prevented. Also, a situation in which the engine cannot restart due to lack of the remaining capacity of the battery 42 can be prevented.

Regarding the alarm, the alarm can be generated when the theft determination system 50 is performing during vehicle parking.

At first, the state estimation portion 23 may calculate extra power consumption by subtracting the power consumption such as a starter necessary to restart the engine from the total remaining capacity of the battery 42. Secondly, the state estimation portion 23 calculates total power consumption per unit time. The total power consumption is the power consumption of the theft determination system 50. Subsequently, the state estimation portion 23 divides the extra remaining capacity by the total power consumption. If the result of the division is less than a threshold (for example 10 [h]), the state estimation portion 23 sends an alarm to a mobile phone of the vehicle owner. Furthermore, when the power consumption of the total remaining capacity of the battery 42 matches or almost matches the power consumption of the starter necessary to restart the engine, the state estimation portion 23 may stop the theft determination system 50 or may reduce the frequency of the process.

Fourth Exemplary Embodiment

Figure 7:
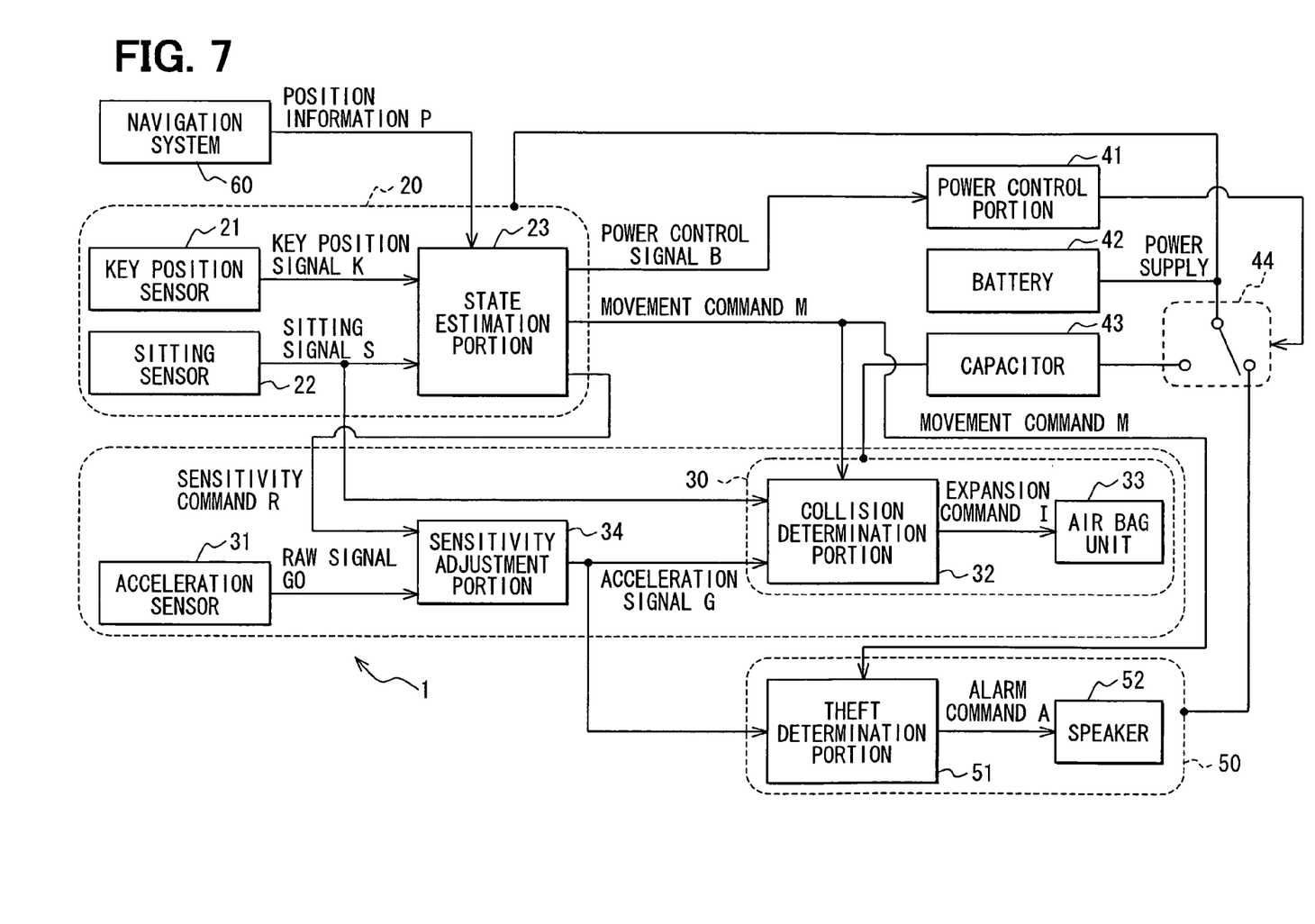
FIG. 7 is a block diagram of an air bag system according to a fourth exemplary embodiment.

A fourth exemplary embodiment is explained with reference to FIG. 7. The difference of the fourth exemplary embodiment from the above the second embodiment is that position information from a navigation system 60 is input to the state estimation portion 23. Regarding the fourth exemplary embodiment, the same numerals are used for components and devices that are identical to those in the above embodiments, and a corresponding explanation is omitted.

The navigation system 60 outputs position information P to the state estimation portion 23. The state estimation portion 23 determines whether a vehicle is on a street on which the danger of being involved in a collision is high or whether the vehicle is in a parking lot or a service station based on this position information P. When the state estimation portion 23 determines the vehicle is on the street, the state estimation portion 23 outputs the movement command M with the collision determination mode (M=AB) and drives the collision determination sub-system 30. On the other hand, when the state estimation portion 23 determines the vehicle is in the parking lot or the service station, the state estimation portion 23 outputs the movement command M with the theft determination mode (M=ST) and drives the theft determination system 50.

Thus, by setting a mode depending on the environment of the place in which the vehicle is stopped, the consumption of unnecessary battery power is suppressed, vehicle safety can be increased and the damage due to theft can be suppressed.

According to use of the position information P of the navigation system 60 for state estimation, presumptive accuracy can be improved. Consequently, because an engine stop other than an idling stop is rare within an intersection area, the air bag unit 33 is preferably in an activated state in which an air bag unit 33 can be deployed.

Regarding the setting in the above mode, the size of the intersection, the length of the waiting time at the signal and traffic density can be included in the determination as well as the state estimation portion 23 by using the position information P and coordinate information such as a global coordinate value. Especially on a road that has more than two traffic lanes on one side, when the vehicle is the second lane (passing lane or right turn lane in Japan), the state estimation portion 23 outputs the movement command M with the collision determination mode (M=AB), and the theft determination system 50 is preferably not driven.

Furthermore, traffic regulations of the country or the area in which the vehicle is operated are stored in a not-illustrated memory. Based on the memory, the theft determination system 50 may not be driven and/or collision determination sub-system 30 may be driven in a no-parking zone (for example, a passing lane) in which vehicle parking is not allowed. Also, when an occupant turns off the engine in a place that does not allow vehicle parking, a warning can be displayed on a screen of the navigation system 60. When an occupant turns off the engine in the place that does not allow vehicle parking and the signal of sitting sensor 22 is equal to "NULL" (when the occupant leaves his seat), the alarm sound may be generated. When an occupant turns off the engine and unfastens his seat belt, an image that provides an alarm that the vehicle is in a position that is a no parking area is displayed on the navigation system 60.

Other Embodiments

Although the present invention has been fully described in connection with the preferred embodiments thereof with reference to the accompanying drawings, it is to be noted that various changes and modifications will become apparent to those skilled in the art.

For example, in the above exemplary embodiments, the fastening and unfastening state of the seat belt was not mentioned. However, vehicle safety is further increased if a process in which the air bag unit 33 is deployed only when a seat belt is fastened is added to the process described in the flow diagram of FIG. 3.

In each above embodiment, key position sensor 21 is used for detecting whether an engine is operating. However, it is not necessary to detect such an engine state by key position sensor 21. For example, the engine crank angle sensor may be instead used. Also, a smart start switch may be adopted for a vehicle that includes the smart entry and start function.

In each above embodiment, an occupant's sitting position is detected by the sitting sensor 22 installed in the seat. However, the sitting position of the occupant may be detected by, for example, a camera installed in the vehicle or a temperature sensor.

Such changes and modifications are to be understood as being within the scope of the present invention as defined by the appended claims.

What is claimed is:

1. A vehicle air bag control system comprising:
   an impact detector for detecting an impact on a vehicle and for outputting an impact detection signal;
   an air bag deployment determination unit for outputting a deployment command when the impact detection signal is more than a predetermined value;
   a state estimation unit for estimating whether a vehicle engine is stopped during an idling stop; and
   a power control unit for driving the impact detector, the air bag deployment determination unit and the state estimation unit when the vehicle engine is stopped during the idling stop as indicated by the state estimation unit.

2. A vehicle air bag control system according to claim 1, wherein:
   the state estimation unit includes an engine state detector for detecting an operation state of the engine and for outputting an engine state, and an occupant detection sensor for detecting whether an occupant is in the vehicle and for outputting an occupant signal; and
   the state estimation unit estimates that the engine stop is caused during the idling stop when the engine state indicates that the engine is stopped and the occupant signal indicates the occupant is in the vehicle.

3. A vehicle air bag control system according to claim 2, wherein
   the occupant detection sensor includes at least one of a sitting position detection sensor installed in a vehicle seat, a camera installed in the vehicle, an infrared sensor for detecting an occupant temperature and a seat belt sensor for detecting whether a seat belt is fastened.

4. A vehicle air bag control system according to claim 1 further comprising:
   a sensitivity adjuster for adjusting the amplification factor of the output signal from the impact detector and for outputting an amplified impact detection signal, wherein
   the state estimation unit estimates whether the engine stops due to vehicle parking and outputs a first sensitivity command when the state estimation unit estimates the engine stops during an idling stop and outputs a second sensitivity command when the state estimation unit estimates that the engine stops due to parking of the vehicle, and
   the sensitivity adjuster adjusts the amplification factor of the output signal from the impact detector based on the first sensitivity command or the second sensitivity command.

5. A vehicle air bag control system according to claim 4 further comprising:
   a theft determination unit for calculating an inclination angle of the vehicle based on the impact detection signal when the state estimation unit outputs the second sensitivity command and for determining whether the vehicle is being stolen based on the inclination angle.

6. A vehicle air bag control system according to claim 5 further comprising:
a capacitor installed between a vehicle battery and the air bag deployment determination unit, wherein
the air bag deployment determination unit is driven by electric power supplied by the capacitor at least when the state estimation unit estimates the engine stops during the idling stop, and
the theft determination unit operates when the state estimation unit estimates the engine stops due to vehicle parking and the capacitor does not supply electric power to the air bag deployment determination unit.

7. A vehicle air bag control system according to claim 6, wherein
the theft determination unit stops operating or decreases the frequency of operation when the state estimation unit estimates the engine stops during a state other than the idling stop and the battery supplies the theft determination unit with electric power and the remaining capacity of the battery is less than a predetermined value.

8. A vehicle air bag control system according to claim 5, wherein
the air bag deployment determination unit is not actuated during operation of the theft determination unit.

9. A vehicle air bag control system according to claim 4, wherein
the state estimation unit estimates that the engine stop is caused by a state other than the idling stop and outputs the second sensitivity command when the engine state indicates the engine stops and the occupant signal indicates the occupant is not in the vehicle.

10. A vehicle air bag control system according to claim 1, wherein:
the state estimation unit includes an engine state detector for detecting an operation state of the engine and for outputting an engine state, and a position information provision unit for providing vehicle position information, and
the state estimation unit estimates that the engine stop is caused during an idling stop when the engine state indicates that the engine stops and the vehicle position provided by the position information provision unit indicates the vehicle is within a predetermined area.

11. A vehicle air bag control system according to claim 10 further comprising:
a sensitivity adjuster for adjusting the amplification factor of the output signal from the impact detector and for outputting an amplified impact detection signal, wherein
the state estimation unit estimates whether the engine stops due to vehicle parking and outputs a first sensitivity command when the state estimation unit estimates the engine stops during the idling stop and outputs a second sensitivity command when the state estimation unit estimates the engine stops due to vehicle parking, and
the sensitivity adjuster adjusts the amplification factor of the output signal from the impact detector based on the first sensitivity command or the second sensitivity command.

12. A vehicle air bag control system according to claim 11 further comprising:
a theft determination unit for calculating an inclination angle of the vehicle based on the impact detection signal when the state estimation unit outputs the second sensitivity command, and for determining whether the vehicle is being stolen based on the inclination angle.

13. A vehicle air bag control system according to claim 10, wherein
the state estimation unit estimates that the engine stop is caused by a state other than the idling stop and outputs the second sensitivity command when the engine state indicates the engine stops and the vehicle position provided by the position information provision means unit indicates that the vehicle is outside the predetermined area.

14. A vehicle air bag control system according to claim 10, wherein
the predetermined area is at least one of an intersection, a passing traffic lane, and a no-parking zone.

15. A vehicle air bag control system according to claim 1, wherein
the state estimation unit warns an occupant in the vehicle when the state estimation unit estimates the engine stops during the idling stop and the remaining capacity of a vehicle battery is less than a predetermined value.

16. A vehicle air bag control system according to claim 1, wherein
the impact detector is an acceleration sensor installed in the vehicle.

17. A vehicle air bag control system comprising:
an impact detector for detecting an impact on a vehicle and for outputting an impact detection signal; and
a microprocessor configured
to output an air bag deployment command when the impact detection signal is more than a predetermined value,
to estimate whether a vehicle engine is stopped during an idling stop, and
to drive the impact detector and deploy an air bag when the vehicle engine is stopped during the idling stop.

18. A method of controlling a vehicle air bag comprising:
detecting an impact on a vehicle and outputting an impact detection signal by using an impact detector; and
providing a microprocessor that is configured to:
output an air bag deployment command when the impact detection signal is more than a predetermined value;
estimate whether a vehicle engine is stopped during an idling stop; and
drive an impact detector and deploy the air bag when the vehicle engine is stopped during the idling stop.

* * * * *